United States Patent [19]

Kuwabara et al.

[11] Patent Number: 4,504,653
[45] Date of Patent: Mar. 12, 1985

[54] PROCESS FOR PRODUCING POLYOLEFIN RESIN PARTICLES

[75] Inventors: Hideki Kuwabara, Hatano; Shohei Yoshimura, Tomioka; Toru Yamaguchi, Hiratsuka; Yoshimi Sudo, Fujisawa, all of Japan

[73] Assignee: Japan Styrene Paper Corporation, Tokyo, Japan

[21] Appl. No.: 498,874

[22] Filed: May 25, 1983

[30] Foreign Application Priority Data

May 26, 1982 [JP] Japan .................................. 57-89393

[51] Int. Cl.³ ......................... C08F 45/28; C08F 45/46
[52] U.S. Cl. .................................... 528/491; 528/494; 528/480
[58] Field of Search ......................... 528/491, 494, 480

[56] References Cited

U.S. PATENT DOCUMENTS

3,563,970  2/1971  Leicht et al. ........................ 528/491

Primary Examiner—John Kight
Assistant Examiner—Marvin L. Moore
Attorney, Agent, or Firm—Wenderoth, Lind & Ponack

[57] ABSTRACT

A process for producing particles having an increased particle diameter from a powder of a polyolefin resin, which comprises heating the polyolefin resin powder at a temperature higher than the melting point of the resin in a dispersion medium in the presence of a dispersing agent and a surface-active agent.

15 Claims, 7 Drawing Figures

Fig. 1

Fig. 4

PROCESS FOR PRODUCING POLYOLEFIN RESIN PARTICLES

This invention relates to a process for granulating a polyolefin resin. More specifically, it relates to a process for granulating a fine powdery polyolefin resin, such as polyolefin resins produced by a suspension or vapor-phase polymerization method, into particles having an increased particle diameter.

Polyolefin resins have been widely used to produce molded articles by various methods such as extrusion and injection molding. In the molding operation, the polyolefin resins are pelletized in advance for easy handling. Pellets of a polyolefin resin are obtained by melt-extruding the resin through fine holes by using an extruder of various types, and then cutting the extrudate by such methods as a strand cutting method or an underwater cutting method. When the polyolefin resin is obtained as a powder as in the case of suspension or vapor-phase polymerization, the pelletizing operation requires a large amount of energy. If the powdery resin has a high molecular weight, the energy consumption further increases. Since the cost of energy has greatly risen in recent years, such a pelletizing operation significantly increases the cost of production.

Another method for pelletizing a powdery polyolefin resin is compression molding. The resin pellets obtained by this method have insufficient strength, and are liable to break during transportation. The use of a binder in an attempt to increase their strength may result in changing the properties of the particles.

Foamed molded articles of polyolefin resins have recently come into widespread use. Such foamed articles are produced, for example, by the so-called bead molding method involving the use of preliminarily foamed particles of the resin. The aforesaid pellets are now used for producing preliminarily foamed particles. Since these pellets have a relatively large size with a cylindrical shape, a flattened shape, etc., they must be processed again. Hence, this requires extra time and labor, and more energy.

It is an object of this invention to remove the aforesaid defects of the prior art, and to provide a process for granulating a polyolefin resin.

We have made extensive investigations in order to achieve the above object, and found that by heating a polyolefin resin powder in a dispersion medium in the presence of a dispersing agent and a surface-active agent, it can be granulated with a low energy requirement while adjusting the particle diameter to a suitable value.

According to this invention, there is provided a process for producing particles having an increased particle diameter from a powder of a polyolefin resin, which comprises heating the polyolefin resin powder at a temperature higher than the melting point of the resin in a dispersion medium in the presence of a dispersing agent and a surface-active agent.

There is no particular restriction on the polyolefin resins which can be granulated by the process of this invention, and any type of polyolefin resins which have been used for molding can be used in this invention. Advantageously, such polyolefin resins have a melt index of generally 0.1 to 15, preferably 0.3 to 12, more preferably 0.5 to 10. The polyolefin resins may have a melting point of generally about 100° to about 180° C., preferably about 105° to about 150° C. The "melting point" of the polyolefin resin in the present specification and the appended claims denotes a temperature corresponding to the peak of an endothermic curve obtained by heating about 6 mg of a sample at a rate of 10° C./min. by means of a differential scanning calorimeter.

Examples of the polyolefin resin used as a starting material in the process of this invention include homopolymers of $C_2$–$C_5$ olefins such as low-density polyethylene (to be sometimes abbreviated LDPE hereinafter), linear low-density polyethylene (to be sometimes abbreviated LLDPE hereinafter), high-density polyethylene, polypropylene and polybutene; copolymers of two or more $C_2$–$C_5$ olefins such as ethylene-propylene copolymer, ethylene-butene copolymer, ethylene-pentene copolymer, propylene-butene copolymer and propylene-pentene copolymer; and copolymers of the aforesaid olefins with other comonomers such as butadiene, styrene and vinyl acetate in which the proportion of units from $C_2$–$C_5$ olefins such as ethylene, propylene and 1-butene is at least 50 mole%, preferably at least 80 mole%, based on the entire copolymer, such as ethylene/butadiene copolymer, propylene-styrene copolymer and ethylene-vinyl acetate copolymer. Among these resins, the ethylene-propylene copolymer and ethylene-butene copolymer are used advantageously. These polyolefin resins may be used singly or in combination, or as a blend with a small amount (not more than 50% by weight, preferably not more than 35% by weight, based on the blend) of another compatible resin such as styrene/butadiene copolymer.

The aforesaid polyolefin resins are industrially produced in large quantities by a suspension or vapor-phase polymerization using coordinated anionic polymerization catalysts such as Ziegler catalysts, and according to such a method, the polyolefin resins are generally obtained as a fine powder. In the process of this invention, such a fine powdery polyolefin resin is conveniently used. There is no particular restriction on the particle size of the powdery polyolefin resin, and powdery polyolefin resins of a desired particle diameter can be freely chosen from commercially available products according to the desired final granulated products. Generally, the powder of the polyolefin resin advantageously has an average particle diameter of not more than 2 mm, preferably not more than 1 mm. In the present specification and the appended claims, the particle diameter of the polyolefin resin is measured by means of a standard sieve stipulated in JIS.

The "dispersing agent" used in the process of this invention denotes an agent which has an effect of preventing a polyolefin resin powder from agglomerating by melt adhesion when it is heated in a dispersion medium together with a surface-active agent in order to granulate it. Examples of such a dispersing agent include inorganic dispersing agents which are generally used as a suspension stabilizer for polymers, such as magnesium carbonate, talc, aluminum oxide, zinc oxide and zinc carbonate; and organic dispersing agents such as nylon and polyethylene terephthalate. In particular, magnesium carbonate, talc and aluminum oxide are suitable because they have an effect of making the polyolefin resin particles spherical.

The dispersing agent is used generally in the form of a fine powder having an average diameter of not more than 10 microns, preferably not more than 5 microns. The amount of the dispersing agent used varies depending upon its kind, the kind of the polyolefin resin, etc. Generally, its amount is 0.04 to 5 parts by weight, preferably 0.08 to 3 parts by weight, more preferably 0.1 to 2 parts by weight, per 100 parts by weight of the polyolefin resin. If the amount of the dispersing agent is less than 0.04 part by weight, the resin particles melt-adhere to each other to form agglomerated masses, and it is difficult to form the intended particles. On the other hand, when the dispersing agent is used in too large an amount, it adheres to the surface of the granulated resin and in an extreme case, granulation of the resin itself becomes impossible.

The surface-active agent used with the dispersing agent is effective for preventing melt adhesion and for granulation when it is used together with the dispersing agent in heating the resin powder in a dispersion medium. The surface-active agent may be any of anionic, cationic and amphoteric surface-active agents. Specific examples of the anionic surface-active agents are metal salts of stearic acid and other fatty acid salts such as calcium stearate, sodium stearate, aluminum stearate, zinc stearate, sodium oleate, calcium oleate, calcium palmitate, metal salts of beef fatty acids, and half-hardened beef tallow sodium soap; alkylbenzenesulfonates such as sodium alkylbenzenesulfonates; alkylsulfuric acid ester salts; and alkylnaphthalenesulfonic acid salts. Examples of the cationic surface-active agents are alkylamine salts and quaternary ammonium salts. Alkylbetaines are examples of the amphoteric surface-active agents. These surface-active agents may be used singly or in combination. Furthermore, as required, they may be used in combination with non-ionic surface active agents such as polyoxyethylene alkyl esters, and polyoxyethylene fatty acid esters.

The stearates are especially preferred.

Figure 1:
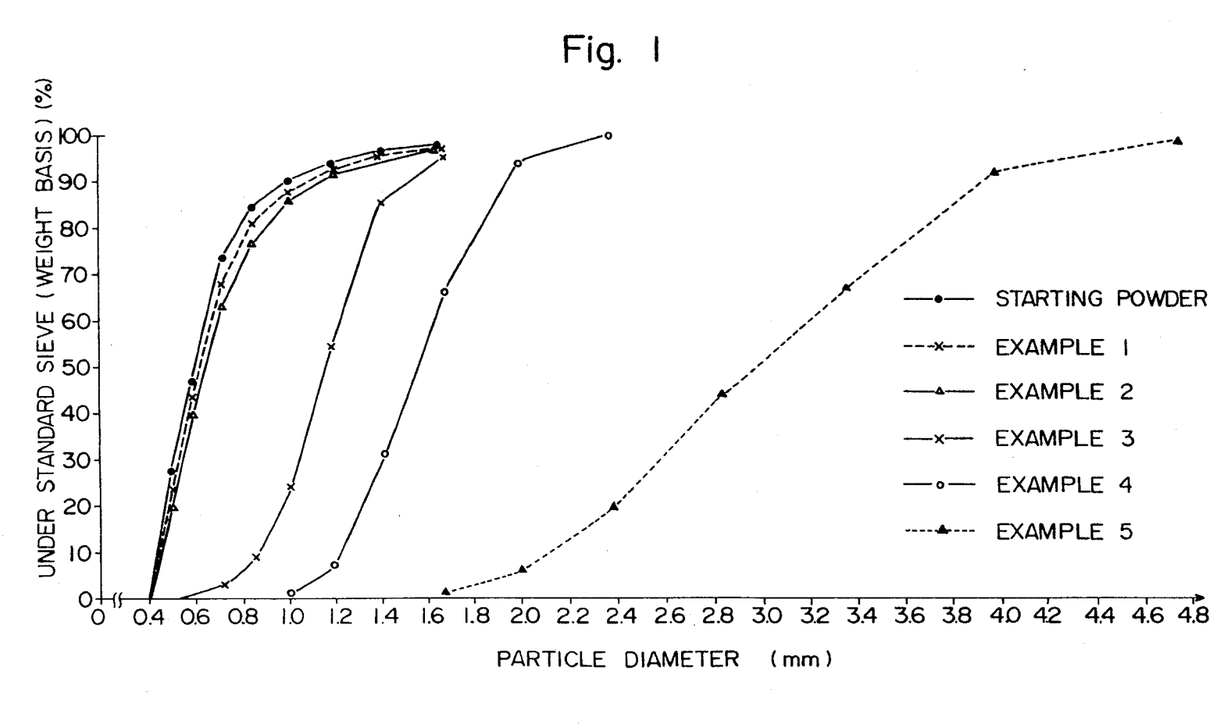

The amount of the surface-active agent is not critical, and can be varied widely according to the kind of the surface-active agent, the kind of the resin, etc. Generally, its amount can be 0.004 to 0.6 part by weight, preferably 0.005 to 0.2 part by weight, more preferably 0.0055 to 0.15 part by weight, per 100 parts by weight of the polyolefin resin. By varying the amount of the surface-active agent, the particle diameter of the resulting polyolefin resin particles can be controlled. For example, as shown in Example 1 given hereinafter, when an ethylene-propylene random copolymer is heated in water in the presence of aluminum oxide as the dispersing agent and calcium stearate as the surface-active agent, with the amount of calcium stearate varied from 0.3 to 0.005 part by weight per 100 parts by weight of the copolymer, the average particle diameter of the resulting copolymer particles can be gradually increased from 0.3 mm to 3.5 mm as shown in FIG. 1 of the accompanying drawings.

The dispersion medium which can be used in practicing the process of this invention may be a liquid which does not substantially dissolve the resin. Water is usually suitable. Other liquids such as glycerol and ethylene glycol may also be used.

The amount of the dispersion medium is not particularly restricted. But if it is used in too large an amount, the productivity decreases. If it is used in too small an amount, melt-adhesion and agglomeration of the powder occurs, and granulation fails. To avoid this defect, it is convenient to use the dispersion medium in an amount of 100 to 1500 parts by weight, preferably 200 to 1000 parts by weight, more preferably 300 to 800 parts by weight, per 100 parts by weight of the resin.

The polyolefin resin powder, dispersing agent and surface active agent are dispersed in the dispersion medium, and then heated. The heating temperature may be a temperature higher than the melting point of the polyolefin resin, preferably a temperature at least 5° C. higher than the melting point, more preferably at least 10° C. higher than the melting point, most preferably 15°-35° C. higher than the melting point.

It has been found very convenient to pre-heat a mixture of these components at a temperature 5°-10° C. higher than the melting point of the polyolefin resin for about 5 to about 15 minutes, and then heat the mixture further at a temperature 10°-35° C. higher than the melting point of the resin for at least 0.25 hour, preferably 0.5 to 1 hour. As the heating time becomes longer, polyolefin resin particles having a larger particle diameter are obtained. It is preferable therefore to control the heating time according to the desired particle size (see Examples 17 to 19 given hereinafter).

If the dispersion medium used has a boiling point lower than the heating temperature, the heating should be carried out usually in a pressure vessel under pressure.

Generally, the aforesaid heating is carried out with stirring. There is no particular restriction on the stirring conditions. Usually, the stirring is carried out at a rotating speed of about 50 to about 500 rpm.

By the aforesaid heating with stirring, the polyolefin resin particles are melted while being dispersed in the dispersing medium. By the synergistic effect of the dispersing agent and the surface-active agent, these particles come together moderately to such an extent that agglomeration does not occur. As a result, they are formed into particles having an increased particle diameter.

After the heat treatment, the dispersion containing the polyolefin resin is cooled. The particles are then separated by a suitable solid-liquid separating means such as filtration and centrifugal separation. Generally, the separated particles are washed and centrifuged, and as required, classified.

By the process of this invention described above, polyolefin resin particles having an increased particle diameter (e.g., with an average particle diameter of 0.3 to 3.5 mm) over the starting polyolefin resin powder can be produced easily by a simple operation with a low energy consumption.

In the above heating process, ordinary additives for polyolefin resins may, as required, be added to the dispersion medium in usual amounts. Examples of the additives are ultraviolet absorbers, lubricants and antioxidants.

The polyolefin resin particles obtained by this invention may be used in many applications as molding material like conventional pellets, but can especially effectively be used as a raw material for the production of preliminarily foamed particles. The preliminarily foamed particles can be obtained by impregnating the particles obtained by the present invention with a volatile blowing agent such as dichlorodifluoromethane at high temperatures and pressures, and releasing them into the surrounding atmosphere.

As stated hereinabove, according to the present invention, polyolefin resin particles having a suitable particle diameter can be easily obtained by heating a polyolefin resin powder in a dispersion medium in the presence of a dispersing agent and a surface-active agent. The process of this invention can be performed at low cost because the amount of energy consumption is small and large-sized facilities are not necessary. These advantages make the process of this invention industrially useful.

The following Examples and Comparative Examples illustrate the present invention in greater detail.

In these examples, the particle size distribution is expressed by weight percent of particles having the indicated particle diameters measured by using a standard sieve stipulated in JIS.

The ethylene-propylene random copolymer used in these examples had an ethylene content of 4.1 mole%, a melting point of 145° C., and a melt index (ASTM, D-1238 of 8. LLDPE used had a melting point of 121° C. and a melt index of 2.

EXAMPLES 1 to 5

A 4.5-liter autoclave was charged with the various ingredients shown in Table 1 in the proportions indicated. They were preheated with stirring at 300 to 350 rpm at 150° C. for 15 minutes and then further heated at 165° C. for 1 hour to obtain copolymer particles. The particles were dried in a centrifugal separator.

Table 1 summarizes the particle size distributions and shapes of the copolymer particles obtained. The particle size distribution curves are shown in FIG. 1.

TABLE 1

| | Starting powder | Example 1 | Example 2 | Example 3 | Example 4 | Example 5 |
|---|---|---|---|---|---|---|
| Formulation | | | | | | |
| Ethylene-propylene random copolymer (g) | | 500 | 500 | 500 | 500 | 500 |
| Water (g) | | 3500 | 3500 | 3500 | 3500 | 3500 |
| Aluminum oxide (20 mμ; g) | | 7.5 | 7.5 | 7.5 | 7.5 | 7.5 |
| Calcium stearate (g) | | 1.5 | 0.5 | 0.05 | 0.029 | 0.025 |
| Particle size distribution (wt. %) | | | | | | |
| 0.42–0.5$^{(mm)}$ | 28.1 | 24.4 | 20.3 | 0.2 | — | — |
| 0.5–0.59 | 18.9 | 19.3 | 20.0 | 0.5 | — | — |
| 0.59–9.71 | 26.5 | 23.9 | 23.0 | 2.6 | 0.2 | — |
| 0.71–0.84 | 10.7 | 13.0 | 13.0 | 6.1 | 0.3 | — |
| 0.84–1.00 | 5.4 | 6.4 | 9.1 | 15.0 | 1.1 | 0.1 |
| 1.00–1.19 | 3.9 | 4.9 | 5.4 | 29.9 | 6.2 | 0.1 |
| 1.19–1.41 | 2.6 | 3.4 | 3.4 | 30.8 | 23.6 | 0.3 |
| 1.41–1.68 | 1.3 | 2.0 | 2.7 | 9.9 | 34.9 | 1.3 |
| 1.68–2.00 | 1.2 | 1.4 | 1.9 | 2.7 | 27.2 | 5.2 |
| 2.00–2.38 | 0.7 | 0.7 | 0.7 | 1.2 | 6.1 | 12.7 |
| 2.38~ | 0.8 | 0.5 | 0.5 | 1.2 | 0.5 | 80.3 |
| Median diameter (*) | 0.59–0.71 | 0.59–0.71 | 0.59–0.71 | 1.00–1.19 | 1.41–1.68 | 2.38~ |
| Shape of the particles | | Irregular | True sphere | True sphere | True sphere | True sphere |

(*)Particle sizes of particles which account for 50% by weight of the whole.

EXAMPLES 6 to 8

A 4.5-liter autoclave was charged with the ingredients shown in Table 2 in the proportions indicated. With stirring, they were heated at 150° C. for 15 minutes, then at 165° C. for 1 hour, and then cooled. The product was worked up in the same way as in Examples 1 to 5 to obtain resin particles. The particle size distributions and shapes of the resin particles are summarized in Table 2.

TABLE 2

| | Example 6 | Example 7 | Example 8 |
|---|---|---|---|
| Formulation | | | |
| Ethylene-propylene random copolymer (g) | 500 | 500 | 500 |
| Water (g) | 3500 | 3500 | 3500 |
| Aluminum oxide (g) (20 mμ) | 7.5 | 7.5 | 7.5 |
| Surface active agent (g) | Sodium stearate (0.5) | Aluminum stearate (0.5) | Zinc stearate (0.5) |
| Particle size distribution (wt. %) | | | |
| 0.42–0.5$^{(mm)}$ | 20.0 | 19.4 | 14.0 |
| 0.5–0.59 | 20.5 | 19.5 | 15.0 |
| 0.59–0.71 | 22.0 | 23.1 | 25.0 |
| 0.71–0.84 | 12.8 | 12.4 | 15.5 |
| 0.84–1.00 | 9.8 | 9.6 | 11.0 |
| 1.00–1.19 | 5.7 | 5.7 | 7.0 |
| 1.19–1.41 | 3.9 | 4.1 | 4.9 |
| 1.41–1.68 | 2.5 | 2.7 | 3.1 |
| 1.68–2.00 | 2.0 | 2.1 | 2.6 |
| 2.00–2.38 | 0.5 | 0.8 | 1.1 |
| 2.38~ | 0.3 | 0.6 | 0.8 |
| Median diameter | 0.59–0.71 | 0.59–0.71 | 0.59–0.71 |
| Shape of the particles | True sphere | True sphere | True sphere |

EXAMPLE 9

Figure 2:
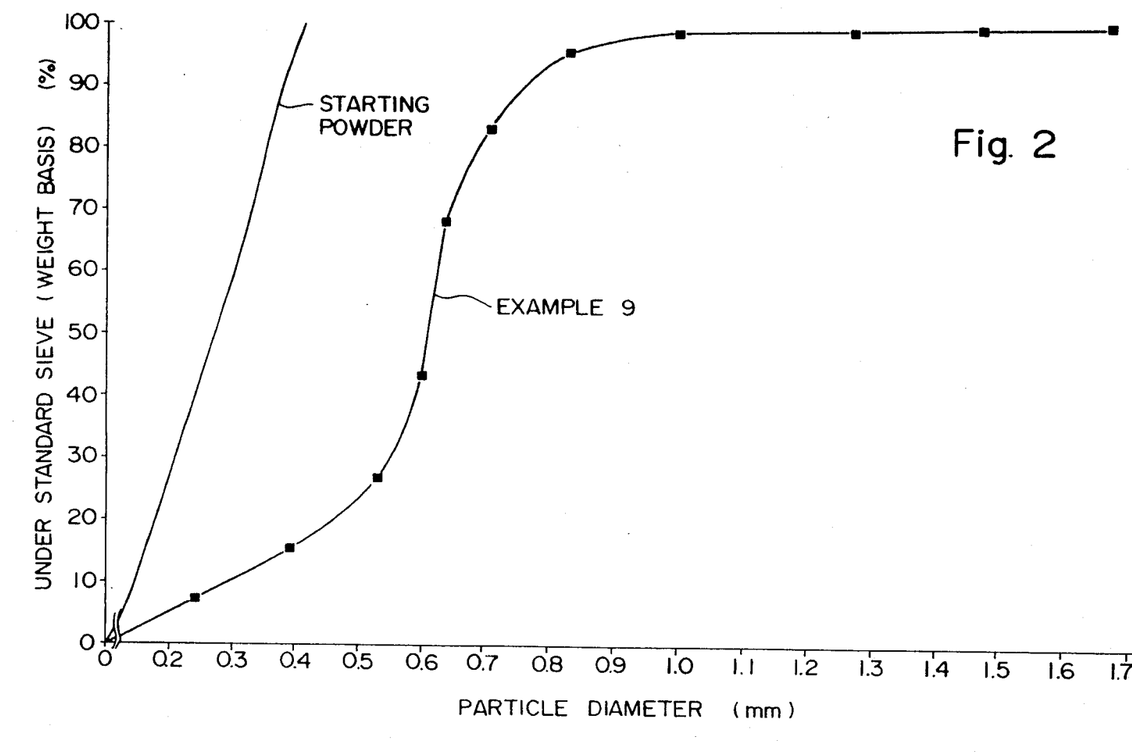

A 4.5-liter autoclave was charged with the ingredients shown in Table 3 in the proportions indicated. With stirring, they were heated at 150° C. for 15 minutes and then at 165° C. for 1 hour, and then worked up in the same way as in Examples 1 to 5 to obtain resin particles. The particle size distributions and shapes of the resulting resin particles are shown in Table 3, and the particle size distribution curves are shown in FIG. 2.

TABLE 3

| | Starting powder | Example 9 |
|---|---|---|
| Formulation | | |
| Ethylene-propylene random copolymer (g) | | 200 |
| Water (g) | | 3000 |
| Aluminum oxide (20 mμ) (g) | | 3 |
| NS Soap (*) (g) | | 0.02 |
| Particle size distribution (wt. %) | | |
| –0.149$^{(mm)}$ | 9.6 | 1.7 |
| 0.149–0.177 | 9.3 | 2.1 |
| 0.177–0.210 | 11.8 | 2.1 |
| 0.210–0.25 | 11.0 | 2.0 |
| 0.25–0.297 | 14.0 | 2.7 |
| 0.297–0.35 | 20.9 | 2.7 |

TABLE 3-continued

|  | Starting powder | Example 9 |
|---|---|---|
| 0.35–0.42 | 23.4 | 4.2 |
| 0.42–0.50 | — | 6.1 |
| 0.50–0.59 | — | 15.2 |
| 0.59–0.71 | — | 44.0 |
| 0.71–0.84 | — | 14.3 |
| 0.84–1.00 | — | 1.0 |
| 1.00–1.19 | — | 1.3 |
| 1.19–1.41 | — | 0.5 |
| 1.41–1.68 | — | 0.1 |
| Median diameter | 0.25–0.297 | 0.59–0.71 |
| Shape of the particles |  | Round but irregular |

(*): Anionic surfactant produced by Kao Soap Co., Ltd.

EXAMPLES 10 to 12

A 4.5-liter autoclave was charged with the ingredients shown in Table 4 in the proportions indicated. With stirring, they were heated at 150° C. for 15 minutes, and then at 165° C. for 1 hour, and then worked up in the same way as in Examples 1 to 5 to obtain resin particles. The particle size distributions and shapes of the resin particles are shown in Table 4.

TABLE 4

|  | Example 10 | Example 11 | Example 12 |
|---|---|---|---|
| Formulation |  |  |  |
| Ethylene-propylene random copolymer (g) | 500 | 500 | 500 |
| Water (g) | 3500 | 3500 | 3500 |
| Dispersing agent (g) | Magnesium carbonate (7.5) | Talc (7μ) (7.5) | Magnesium oxide (7.5) |
| Calcium stearate (g) | 0.5 | 0.5 | 0.5 |
| Particle size distribtion (wt. %) |  |  |  |
| 0.42–0.5$^{(mm)}$ | 20.3 | 19.6 | 21.5 |
| 0.5–0.59 | 20.0 | 18.5 | 22.0 |
| 0.59–0.71 | 23.5 | 22.5 | 24.0 |
| 0.71–0.84 | 12.8 | 13.5 | 13.0 |
| 0.84–1.00 | 9.3 | 9.8 | 8.9 |
| 1.00–1.19 | 5.2 | 5.5 | 4.4 |
| 1.19–1.41 | 3.2 | 3.5 | 2.4 |
| 1.41–1.68 | 2.5 | 2.9 | 1.8 |
| 1.68–2.00 | 1.8 | 2.0 | 1.3 |
| 2.00–2.38 | 0.8 | 1.2 | 0.7 |
| 2.38~ | 0.6 | 1.0 | — |
| Median diameter | 0.59–0.71 | 0.59–0.71 | 0.59–0.71 |
| Shape of the particles | True sphere | True sphere | True sphere |

EXAMPLE 13

Figure 3:
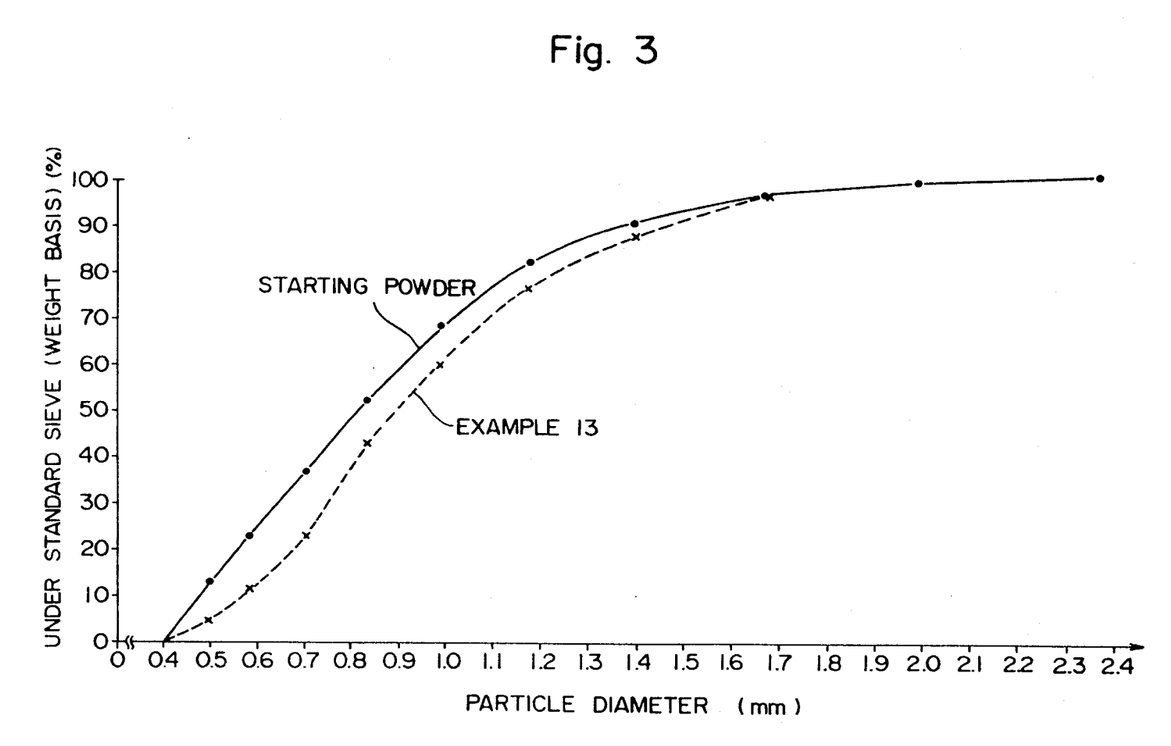

A 4.5-liter autoclave was charged with LLDPE having the particle size distribution shown in Table 5 and the ingredients shown in Table 5 in the proportions indicated. With stirring, they were heated at 126° C. for 15 minutes, then at 142° C. for 1 hour, and worked up in the same way as in Examples 1 to 5 to obtain resin particles. The particle size distributions and shapes of the resin particles are shown in Table 5, and the particle size distribution curves are shown in FIG. 3.

TABLE 5

|  | Starting powder | Example 13 |
|---|---|---|
| Formulation |  |  |
| LLDPE powder (g) |  | 500 |
| Water (g) |  | 3500 |
| Aluminum oxide (g) |  | 7.5 |

TABLE 5-continued

|  | Starting powder | Example 13 |
|---|---|---|
| Calcium stearate (g) |  | 0.5 |
| Particle size distribution (wt. %) |  |  |
| 0.42–0.5$^{(mm)}$ | 13.0 | 5.0 |
| 0.5–0.59 | 10.0 | 7.0 |
| 0.59–0.71 | 14.0 | 11.2 |
| 0.71–0.84 | 15.0 | 20.1 |
| 0.84–1.00 | 16.2 | 16.3 |
| 1.00–1.19 | 13.3 | 16.5 |
| 1.19–1.41 | 8.5 | 11.2 |
| 1.41–1.68 | 6.0 | 8.4 |
| 1.68–2.00 | 3.2 | 2.7 |
| 2.00–2.38 | 0.8 | 1.6 |
| 2.38~ | — | — |
| Median diameter | 0.71–0.84 | 0.84–1.00 |
| Shape of the particles |  | True sphere |

EXAMPLE 14

Figure 4:
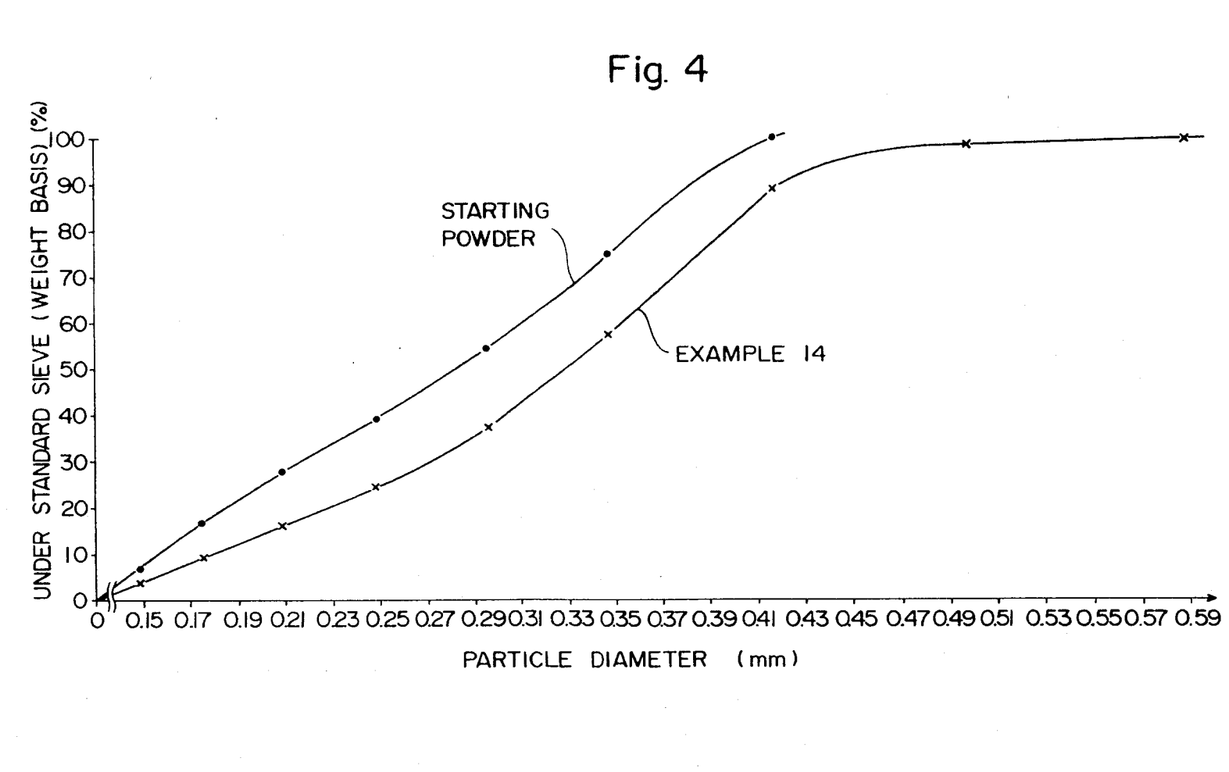

A 4.5-liter autoclave was charged with the ingredients shown in Table 6 in the proportions indicated. With stirring, they were heated at 150° C. for 15 minutes and then at 165° C. for 1 hour, and worked up in the same way as in Examples 1 to 5 to obtain copolymer particles. The particle size distributions and shapes of the resulting copolymer particles are shown in Table 6. The particle size distribution curves are shown in FIG. 4.

TABLE 6

|  | Starting powder | Example 14 |
|---|---|---|
| Formulation |  |  |
| Ethylene-propylene random copolymer (g) |  | 500 |
| Water (g) |  | 3500 |
| Aluminum oxide (20 mμ) (g) |  | 7.5 |
| Calcium stearate (g) |  | 0.25 |
| Particle size distribution (wt. %) |  |  |
| ~0.149$^{(mm)}$ | 7.7 | 3.9 |
| 0.149–0.177 | 8.4 | 5.8 |
| 0.177–0.210 | 11.8 | 6.3 |
| 0.210–0.250 | 10.6 | 8.3 |
| 0.250–0.297 | 15.7 | 12.9 |
| 0.297–0.350 | 20.3 | 20.0 |
| 0.35–0.42 | 25.5 | 31.8 |
| 0.42–0.50 | — | 10.5 |
| 0.50–0.59 | — | 0.4 |
| 0.59–0.71 | — | 0.1 |
| Medium diameter | 0.25–0.297 | 0.297–0.350 |
| Shape of the particles |  | True sphere |

EXAMPLES 15 and 16

Figure 5:
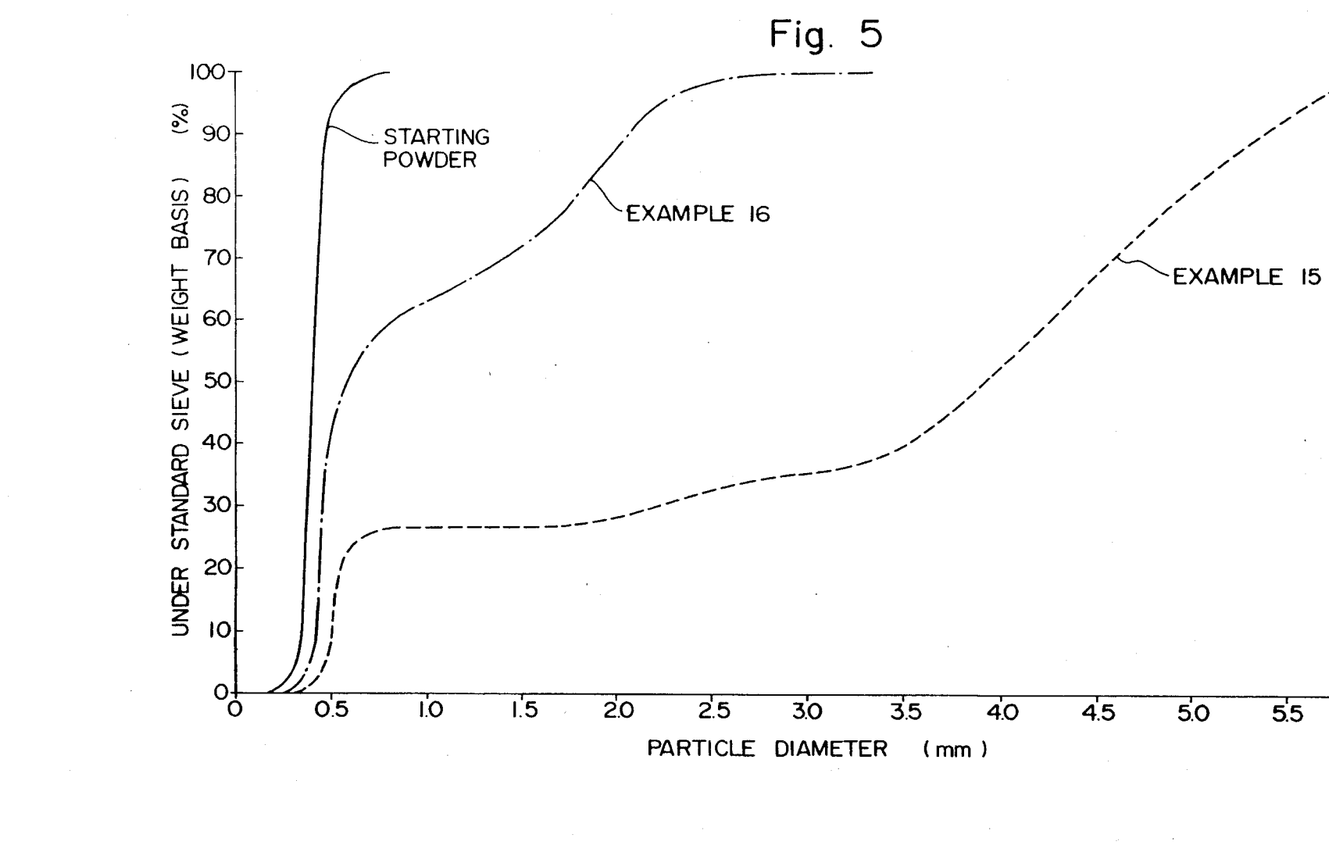

A 4.5-liter autoclave was charged with the ingredients shown in Table 7 in the proportions indicated. With stirring, they were heated at 150° C. for 15 minutes and then at 165° C. for 1 hour, and worked up in the same way as in Examples 1 to 5. The particle size distributions and shapes of the resulting copolymer particles are shown in Table 7, and particle size distribution curves are shown in FIG. 5.

TABLE 7

|  | Starting powder | Example 15 | Example 16 |
|---|---|---|---|
| Formulation |  |  |  |
| Ethylene-propylene random copolymer (g) |  | 200 | 200 |
| Water (g) |  | 3000 | 3000 |
| Aluminum oxide |  | 3 | 3 |

EXAMPLES 17 to 19

Figure 6:
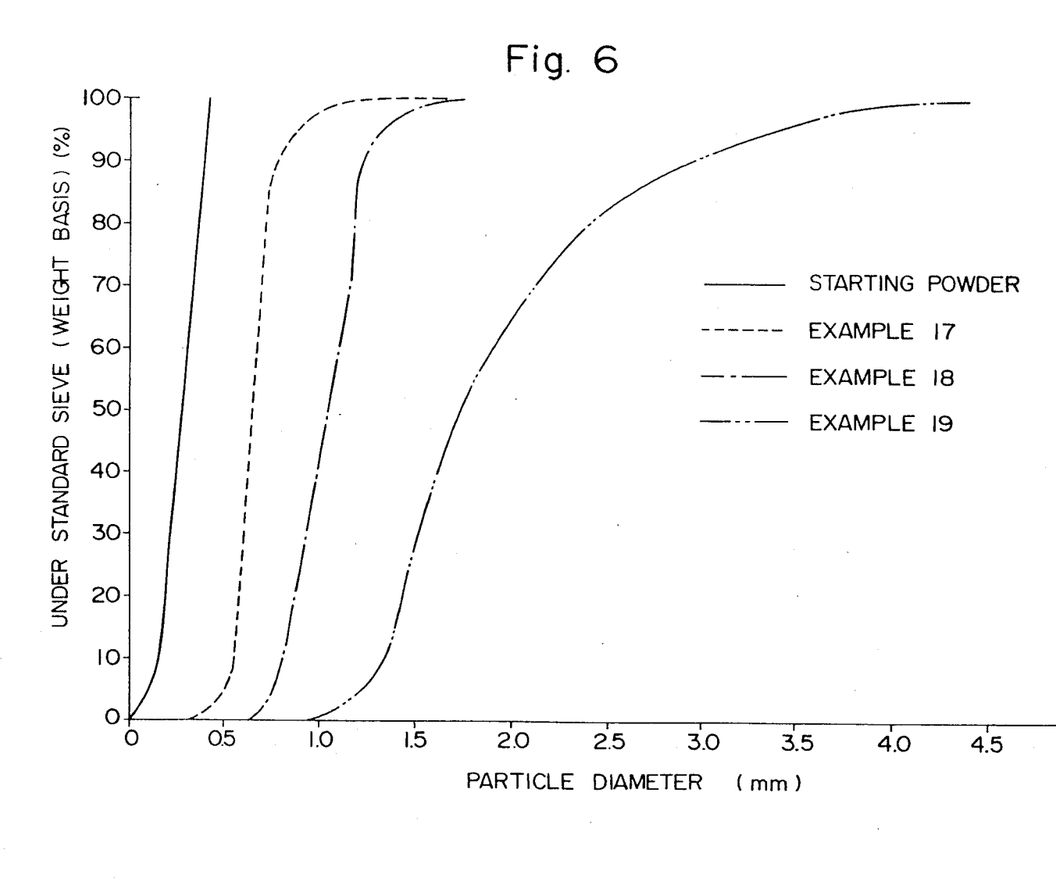

A 4.5-liter autoclave was charged with the ingredients shown in Table 8 in the proportions indicated. With stirring, they were heated under the heating conditions shown in Table 8, and worked up in the same way as in Examples 1 to 5 to obtain copolymer particles. The particle size distributions and shapes of the resulting copolymer particles are shown in Table 8, and the particle size distribution curves are shown in FIG. 6.

TABLE 8

| | Starting powder | Example 17 | Example 18 | Example 19 |
|---|---|---|---|---|
| Formulation | | | | |
| Ethylene-propylene random copolymer (g) | | 200 | 200 | 200 |
| Water (g) | | 3000 | 3000 | 3000 |
| Aluminum oxide (20 mµ) (g) | | 3 | 3 | 3 |
| Calcium stearate (g) | | 0.02 | 0.02 | 0.02 |
| conditions | | 150° C., 15 min. 1650° C., 30 min. | 150° C. 15 min. 165° C., 1 hr. | 150° C., 15 min. 165° C., 3 hrs. |
| Particle size distribution (wt. %) | | | | |
| −0.149$^{(mm)}$ | 9.6 | — | — | — |
| 0.149–0.177 | 9.3 | — | — | — |
| 0.177–0.210 | 11.8 | — | — | — |
| 0.210–0.25 | 11.0 | — | — | — |
| 0.25–0.297 | 14.0 | 0.1 | — | — |
| 0.297–0.35 | 20.9 | 0.2 | — | — |
| 0.35–0.42 | 23.4 | 0.8 | | |
| 0.42–0.50 | — | 4.1 | — | — |
| 0.50–0.59 | — | 12.6 | — | — |
| 0.59–0.71 | — | 48.4 | 2.6 | 0.1 |
| 0.71–0.84 | — | 25.6 | 10.8 | 0.1 |
| 0.84–1.00 | — | 6.9 | 25.5 | 0.5 |
| 1.00–1.19 | — | 1.0 | 37.8 | 3.4 |
| 1.19–1.41 | — | — | 20.7 | 14.1 |
| 1.41–1.68 | — | — | 2.4 | 21.3 |
| 1.68–2.00 | — | — | 0.2 | 24.3 |
| 2.00–2.38 | — | — | — | 14.7 |
| 2.38–2.83 | — | — | — | 9.5 |
| 2.83–3.36 | — | — | — | 5.6 |
| 3.36–4.00 | — | — | — | 6.3 |
| 4.00–4.76 | — | — | — | 0.1 |
| Median diameter | 0.25–0.297 | 0.59–0.71 | 1.00–1.19 | 1.68–2.00 |
| Shape of the particles | | Football-like | True sphere | True sphere |

EXAMPLE 20

Figure 7:
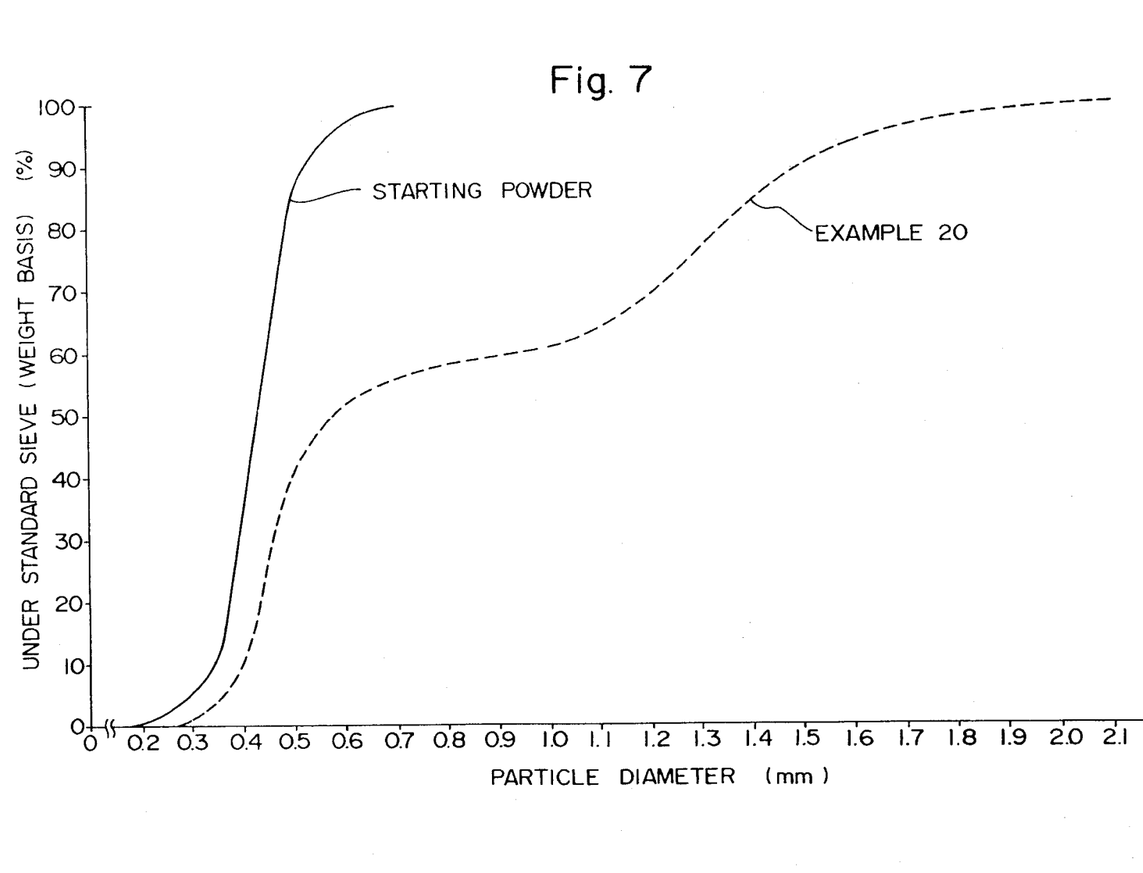

A 4.5-liter autoclave was charged with the ingredients shown in Table 9 in the proportions indicated. With stirring, they were heated at 150° C. for 15 minutes and then at 165° C. for 1 hour, and then worked up in the same way as in Examples 1 to 5 to obtain copolymer particles. The particle size distributions and shapes of the resulting copolymer particles are shown in Table 9, and the particle size distribution curves are shown in FIG. 7.

TABLE 9

| | Starting powder | Example 20 |
|---|---|---|
| Formulation | | |
| Ethylene-propylene random copolymer (g) | | 200 |
| Water (g) | | 3000 |
| Aluminum oxide (g) | | 3 |
| Calcium oxide (g) | | 0.1 |
| Emulgen-120 (*1) (g) | | 0.1 |
| Particle size distribution (wt. %) | | |
| −1.49$^{(mm)}$ | 0.3 | — |
| 0.149–0.177 | 0.3 | — |

TABLE 7-continued

| | Starting powder | Example 15 | Example 16 |
|---|---|---|---|
| (20 mµ) (g) | | | |
| Surfactant (g) | | ACETAMIN(*1) 0.2 | AMPHITOL(*2) 0.2 |
| Particle size distribution (wt. %) | | | |
| ∼0.149$^{(mm)}$ | 0.3 | — | — |
| 0.149–0.177 | 0.3 | — | — |
| 0.177–0.210 | 0.7 | — | — |
| 0.210–0.250 | 1.3 | 0.1 | — |
| 0.250–0.297 | 3.0 | 0.3 | 0.7 |
| 0.297–0.350 | 11.3 | 0.7 | 2.0 |
| 0.35–0.42 | 26.9 | 3.6 | 10.8 |
| 0.42–0.50 | 38.5 | 10.1 | 20.4 |
| 0.50–0.59 | 15.1 | 8.0 | 16.3 |
| 0.59–0.71 | 2.4 | 4.2 | 7.0 |
| 0.71–0.84 | 0.1 | 0.2 | 1.7 |
| 0.84–1.00 | 0.1 | 0.1 | 2.2 |
| 1.00–1.19 | — | 0.2 | 3.4 |
| 1.19–1.41 | — | 0.4 | 5.2 |
| 1.41–1.68 | — | 0.8 | 6.1 |
| 1.68–2.00 | — | 1.6 | 11.7 |
| 2.00–2.38 | — | 2.0 | 9.3 |
| 2.38–2.83 | — | 2.9 | 2.9 |
| 2.83–3.36 | — | 3.1 | 0.3 |
| 3.36–4.00 | — | 11.7 | — |
| 4.00–4.76 | — | 25.1 | — |
| 4.76–5.66 | — | 20.4 | — |
| 5.66– | — | 4.5 | — |
| Median diameter | 0.42–0.50 | 3.36–4.76 | 0.50–0.59 |
| Shape of the particles | | Spherical | Spherical |

(*1): Cationic surfactant produced by Kao Soap Co., Ltd.
(*2): Amphoteric surfactant produced by Kao-Atlas Co., Ltd.

TABLE 9-continued

| | Starting powder | Example 20 |
|---|---|---|
| 0.177–0.219 | 0.7 | — |
| 0.210–0.250 | 1.3 | 0.3 |
| 0.250–0.297 | 3.0 | 1.0 |
| 0.297–0.350 | 11.3 | 3.2 |
| 0.35–0.42 | 26.9 | 11.8 |
| 0.42–0.50 | 28.5 | 21.6 |
| 0.50–0.59 | 15.1 | 13.3 |
| 0.59–0.71 | 2.4 | 4.9 |
| 0.71–0.84 | 0.1 | 2.2 |
| 0.84–1.00 | 0.1 | 2.5 |
| 1.00–1.19 | — | 6.6 |
| 1.19–1.41 | — | 16.3 |
| 1.41–1.68 | — | 11.9 |
| 1.68–2.00 | — | 4.0 |
| 2.00–2.38 | — | 0.4 |
| Median diameter | 0.42–0.50 | 0.50–0.59 |
| Shape of the particles | | Spherical |

(*1): Non-ionic surfactant produced by Kao-Atlas Co., Ltd.

COMPARATIVE EXAMPLES 1 to 4

A 4.5-liter autoclave was charged with the ingredients shown in Table 10 in the proportions indicated. With stirring, they were heated at 150° C. for 15 minutes and then at 165°·C. for 1 hour (in the case of the ethylenepropylene random copolymer powder having the same particle size distribution as in Example 1); and at 126° C. for 15 minutes and then at 142° C. for 1 hour (in the case of the LLDPE powder having the same particle size distribution as in Example 13). The products were each worked up in the same way as in Examples 1 to 5 to obtain resin particles. In each run, all the resin particles melt-adhered into a single mass.

TABLE 10

| Comparative Example | 1 | 2 | 3 | 4 |
|---|---|---|---|---|
| Formulation | | | | |
| Powder (g) | Ethylene-propylene random copolymer (500) | Ethylene-propylene random copolymer (500) | LLDPE (500) | LLDPE (500) |
| Water (g) | 3500 | 3500 | 3500 | 3500 |
| Dispersing agent (g) | — | Aluminum oxide (7.5) | — | Aluminum oxide (7.5) |
| Calcium stearate (g) | 0.5 | — | 0.5 | — |
| State of the particles | Melt-adhered at 145° C. | Melt-adhered at 145° C. | Melt-adhered at 126° C. | Melt-adhered at 126° C. |

What is claimed is:

1. A process for producing particles having an increased particle diameter from a powder of a polyolefin resin, which comprises heating the polyolefin resin powder at a temperature higher than the melting point of the resin in a dispersion medium in the presence of an inorganic dispersing agent and a surface-active agent.

2. The process of claim 1 wherein the polyolefin resin is selected from the group consisting of homopolymers of $C_2$–$C_5$ olefins, copolymers of at least two $C_2$–$C_5$ olefins with each other, and copolymers of $C_2$–$C_5$ olefins in a major proportion with other comonomers.

3. The process of claim 1 wherein the polyolefin resin is selected from the group consisting of low-density polyethylene, linear low-density polyethylene, high-density polyethylene, polypropylene, polybutene, ethylene-propylene copolymer, ethylene-butene copolymer, ethylene-pentene copolymer, propylene-butene copolymer, propylene-pentene copolymer, ethylene-butadiene copolymer, propylene-styrene copolymer and ethylene-vinyl acetate copolymer.

4. The process of claim 1 wherein the polyolefin resin has a melt index of 0.1 to 15.

5. The process of claim 1 wherein the polyolefin resin powder has an average particle diameter of not more than 2 mm.

6. The process of claim 1 wherein the dispersing agent is selected from the group consisting of magnesium carbonate, talc, aluminum oxide, zinc oxide and zinc carbonate.

7. The process of claim 1 wherein the dispersing agent has an average particle diameter of not more than 10 microns.

8. The process of claim 1 wherein the dispersing agent is used in an amount of 0.04 to 5 parts by weight per 100 parts by weight of the polyolefin resin.

9. The process of claim 1 wherein the surface-active agent is selected from the group consisting of anionic surface-active agents, cationic surface-active agents and amphoteric surface-active agents.

10. The process of claim 1 wherein the surface-active agent is a metal salt of stearic acid.

11. The process of claim 1 wherein the surface-active agent is used in an amount of 0.004 to 0.6 part by weight per 100 parts by weight of the polyolefin resin.

12. The process of claim 1 wherein the dispersion medium is water.

13. The process of claim 1 wherein the dispersion medium is used in an amount of 100 to 1500 parts by weight per 100 parts by weight of the polyolefin resin.

14. The process of claim 1 wherein the heating is carried out at a temperature at least 5° C. higher than the melting point of the polyolefin resin.

15. The process of claim 1 wherein the polyolefin resin is pre-heated at a temperature 5° to 10° C. higher than the melting point of the polyolefin resin for about 5 to about 15 minutes, and then heated at a temperature 10° to 35° C. higher than the melting point of the polyolefin resin for at least 0.25 hour.

* * * * *